(12) United States Patent  
Morgan et al.

(10) Patent No.: US 8,181,557 B2  
(45) Date of Patent: May 22, 2012

(54) POWER SAW WITH MITER ANGLE ADJUSTMENT

(76) Inventors: Jonathan Buckner Morgan, Cookeville, TN (US); Robert Lee Owens, Franklin, TN (US)

( * ) Notice: Subject to any disclaimer, the term of this patent is extended or adjusted under 35 U.S.C. 154(b) by 555 days.

(21) Appl. No.: 12/321,145

(22) Filed: Jan. 21, 2009

(65) Prior Publication Data

US 2010/0180743 A1 Jul. 22, 2010

(51) Int. Cl.
*B26D 7/01* (2006.01)

(52) U.S. Cl. ..................................... 83/468.6; 83/471.3

(58) Field of Classification Search ................. 83/467.1, 83/468.6, 471.2, 471.3, 477.1, 581
See application file for complete search history.

(56) References Cited

U.S. PATENT DOCUMENTS

| 2,316,971 A | * | 4/1943 | Overacker et al. | ........... 83/468.6 |
| 4,875,399 A | * | 10/1989 | Scott et al. | ................... 83/468.3 |
| 2006/0096428 A1 | * | 5/2006 | Garcia et al. | ................. 83/102.1 |

* cited by examiner

*Primary Examiner* — Stephen Choi (57) ABSTRACT

This specification discloses a mechanism that alters the cutting angle of a motorized miter saw. The cutting angle is altered by a mechanism that deploys a member from underneath the cutting material resting surface to above the cutting material resting surface. When deployed above the cutting material resting surface, the angle between the blade and cutting material is altered.

13 Claims, 15 Drawing Sheets

FIG_1

POWER SAW WITH MITER ANGLE ADJUSTMENT

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

Field of Invention

This invention relates to power saws; specifically, power saws capable of making miter angle adjustments.

When trimming windows, doorways, and the like, there are typically two vertical pieces of trim boards, a horizontal trim board at the top, and for widows a couple of boards for the sill. Consider where the vertical pieces intersect the horizontal piece. At the intersection, each of the boards would have to be cut at a 45 degree angle. Professional carpenters want the boards to meet in such a manner that the vertical and horizontal boards look almost like one piece. This can be achieved by raising the board off of the miter saw base by a small amount when making the 45 degree cut. Typically, a professional carpenter would put a portion of a pencil or other similar item under the board to raise it slightly when making the 45 degree cut. Therefore, when the boards are put in place, this results in the horizontal board and vertical board contacting on an edge instead of complete contact on the adjoining surfaces. The edge is the edge that is visible when looking at the window framing. Because of this edge type contact, the boards look as if they are almost one board.

Miter saws have an adjustment that can produce the same type cut without using a pencil or similar item as an offset; however the adjustment is time consuming. On most miter saws, one would have to reach behind the saw and rotate a knob, tilt the saw head, and tighten the knob. For a professional carpenter, the time to do this is prohibitive. One saw manufacturer makes a saw which allows the adjustment to be made from the front of the saw. Even so, making the adjustment is time consuming. Additionally, because of the mass of the saw motor, making the adjustment quickly is awkward. Once the adjustment was made, it would be easy to not notice it, which would result in incorrect cuts when making trimming cuts other than the one described above, or worse yet when making framing cuts.

Objects and Advantages

This invention remedies the previously mentioned problems by providing a power saw with a miter angle adjustment specifically designed for trimming applications. The power saw with miter angle adjustment has the following advantages:

a) Makes an adjustment in the miter angle such that trimming pieces will adjoin on an edge.
b) Provides a way to make the adjustment very quickly.
c) Provides a way to remove the adjustment very quickly.
d) Makes it clear whether the adjustment is or is not in place.

SUMMARY

In accordance with the present invention, a power saw with a miter angle adjustment.

DRAWINGS

Figures

Reference Numerals 10 power saw
20 power saw motor
30 power saw blade
40 cutting material resting surface
50 offset
60 saw embodiment with rack and pinion offset positioning
70 rack
80 pinion
90 rack and pinion supporting structure
100 bracket
110 shaft
120 handle
130 sliding bar
140 channel for sliding bar
150 rotating bar
160 hinge
170 rotating bar channel
180 offset defining structure
190 hinge
200 spring
210 first positioning surface
220 second positioning surface
230 bar 1 of the four bar mechanism
240 bar 2 of the four bar mechanism
250 bar 3 of the four bar mechanism
260 bar 4 of the four bar mechanism
270 rotational joint
280 rotational joint with a threaded receptor
290 threaded rod
300 universal joint
310 structure positioning handle
320 handle
330 spring
340 restraining link
350 structure positioning latch
360 latch
365 latch keyhole
370 structure defining offset
380 shaft
390 shaft bearings
400 shaft restrainer
410 handle
420 spring
430 horizontal restraining member
440 vertical structural member
450 hinge
460 rectangular portion of shaft
470—Offset prior to adding attachment that extends the offset
480—Attachment for extending offset
490—Screw

DETAILED DESCRIPTION

FIGS. 1-4—Preferred Embodiment

Figure 1:
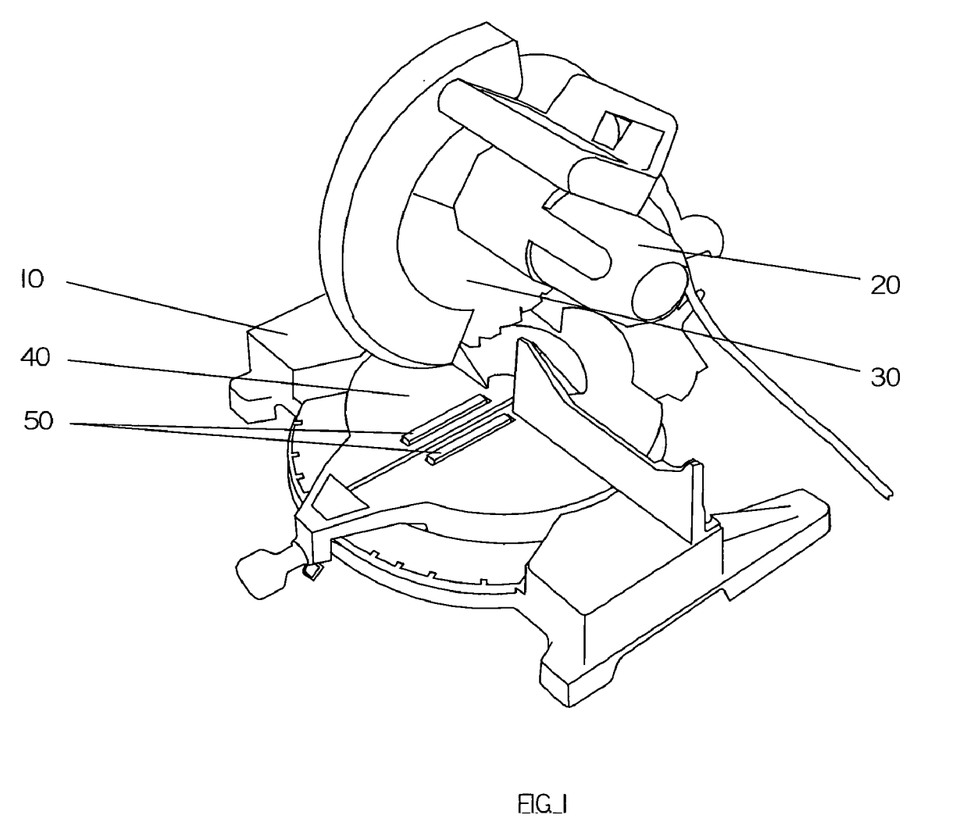
FIG. 1 shows an isometric view of a miter saw with the offset that produces the miter angle adjustment.
Figure 2:
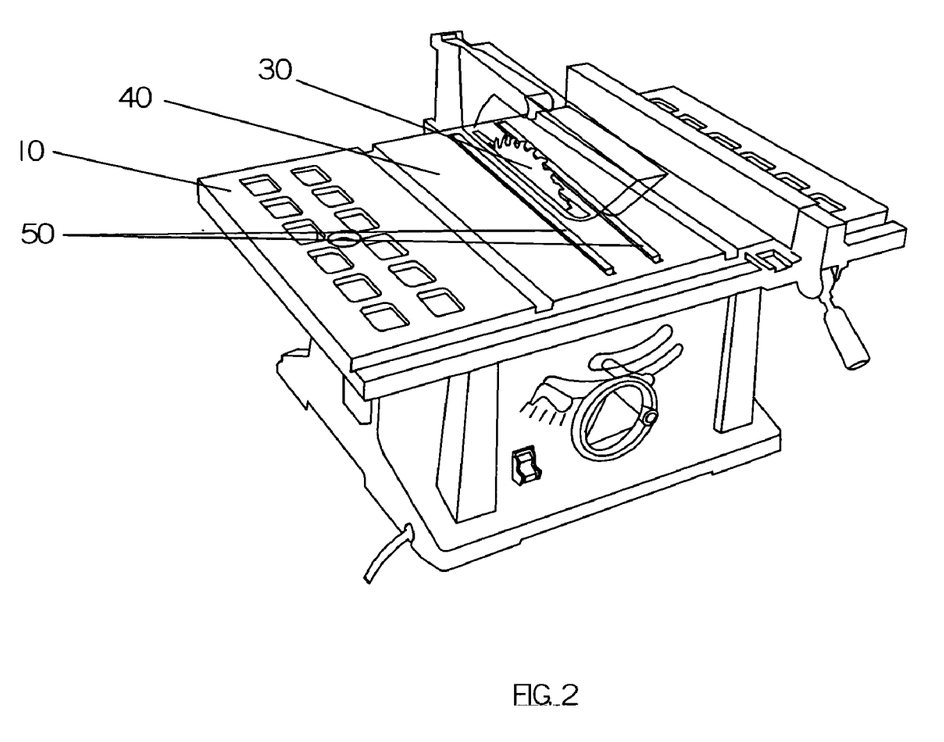
FIG. 2 shows an isometric view of a table saw with the offset that produces the miter angle adjustment.
Figure 3:
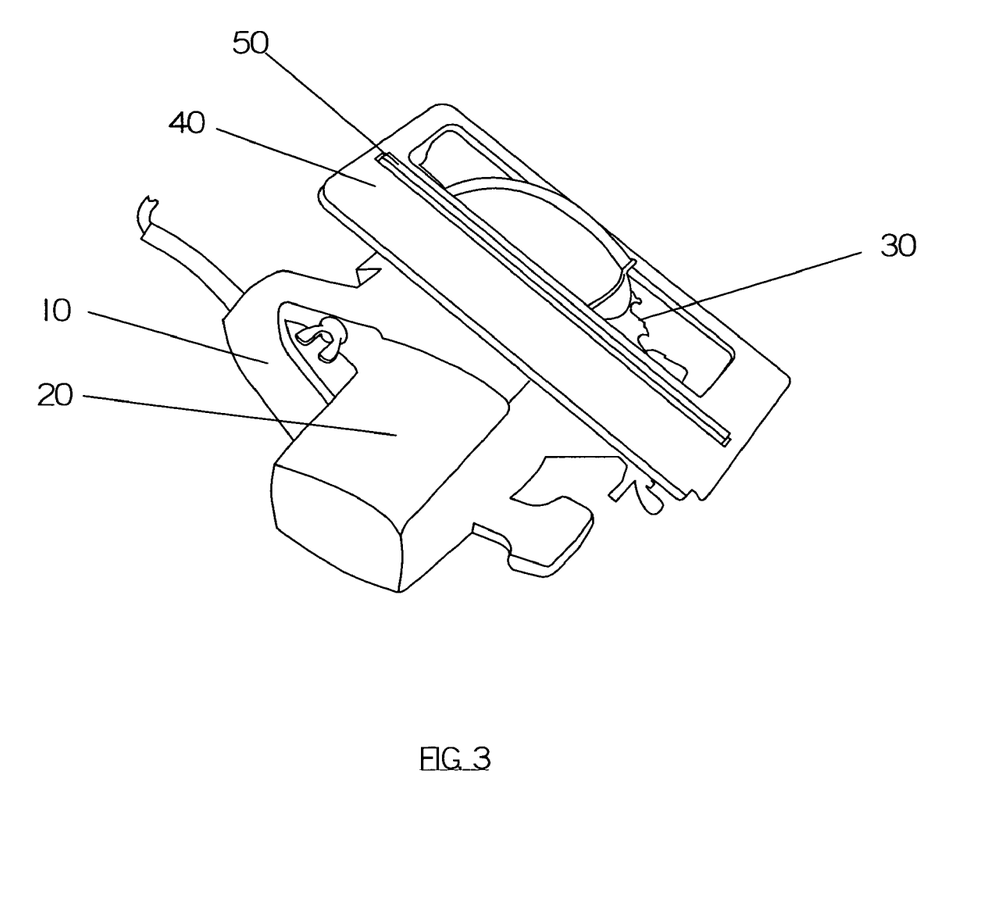
FIG. 3 shows an isometric view of a skill saw with the offset that produces the miter angle adjustment.
Figure 4:
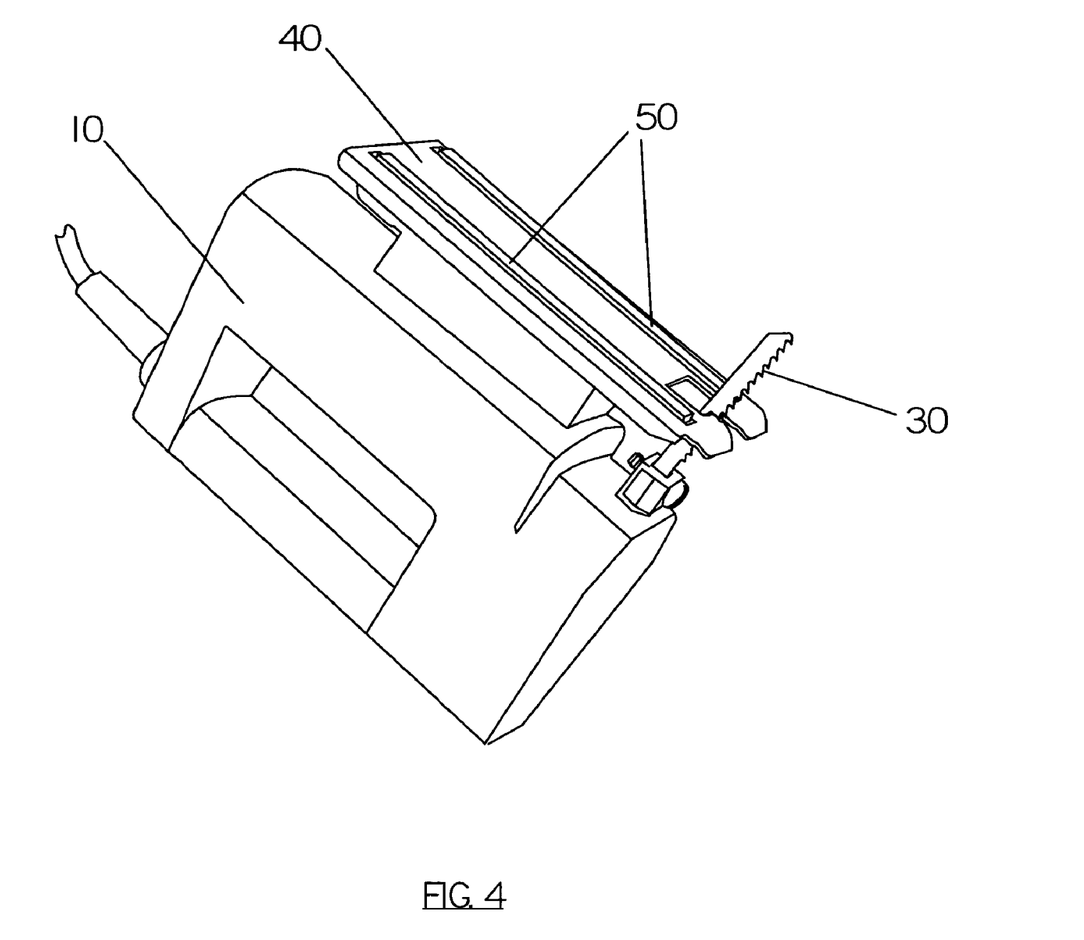
FIG. 4 shows an isometric view of a jig saw with the offset that produces the miter angle adjustment.

This invention, at a minimum, applies to four types of saws as illustrated in the Figures listed below:
Miter Saw: FIG. 1
Table Saw: FIG. 2
Skill Saw: FIG. 3
Jig Saw: FIG. 4

In FIGS. 1 thru 4 the saw 10 has a motor 20, a cutting blade 30, a cutting material resting surface 40, and an offset 50, wherein the offset changes the cutting angle between the cutting blade 30 and the cutting material (not shown).

Figure 5:
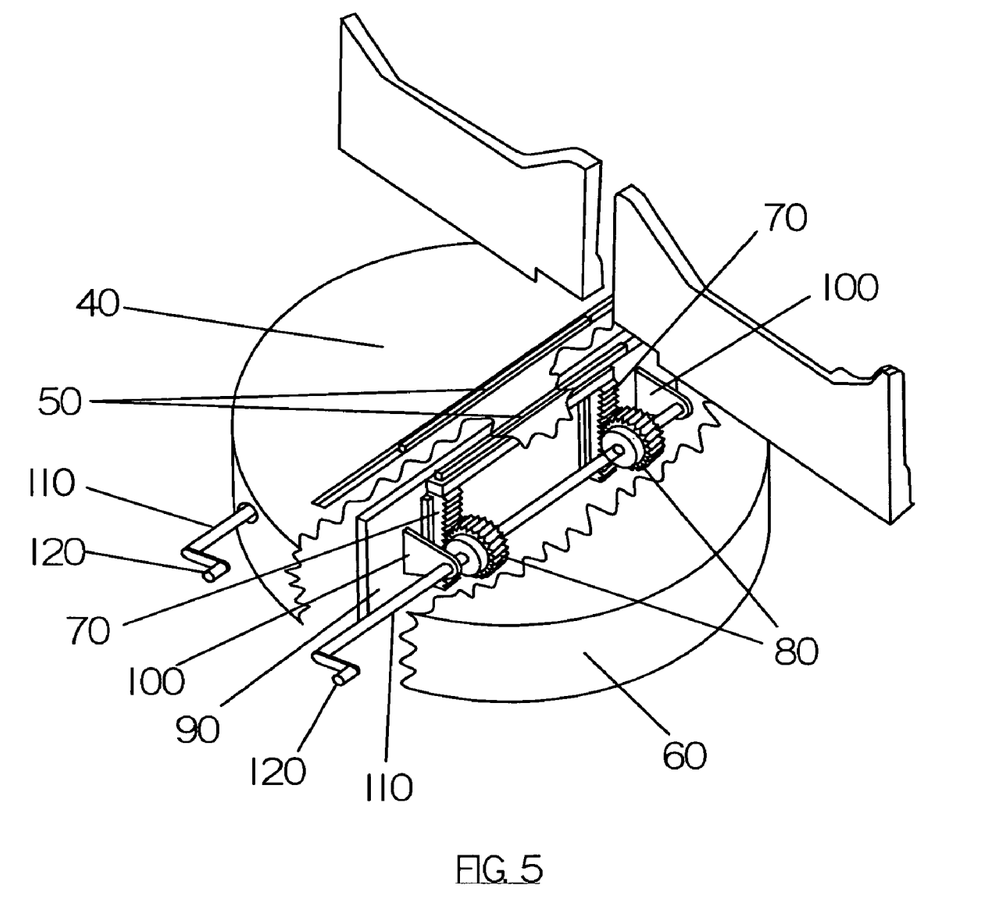
FIG. 5 shows an isometric view of a rack and pinion system that positions the offset.

A preferred embodiment of the saw of the present invention is illustrated in FIG. 5 wherein the offset 50 is positioned via a rack 70 and a pinion 80. The pinion 80 is connected to a shaft 110 that is positioned by a bracket 100 that is connected to the supporting structure 90. The shaft 110 is connected to the handle 120 where rotation of the handle 120 rotates the shaft 110 which rotates the pinion 80 which moves the offset 50 relative to the cutting material resting surface 40. This results in the offset 50 moving from a position below the cutting material resting surface 40 to a plurality of positions above the cutting material resting surface 40.

Figure 6:
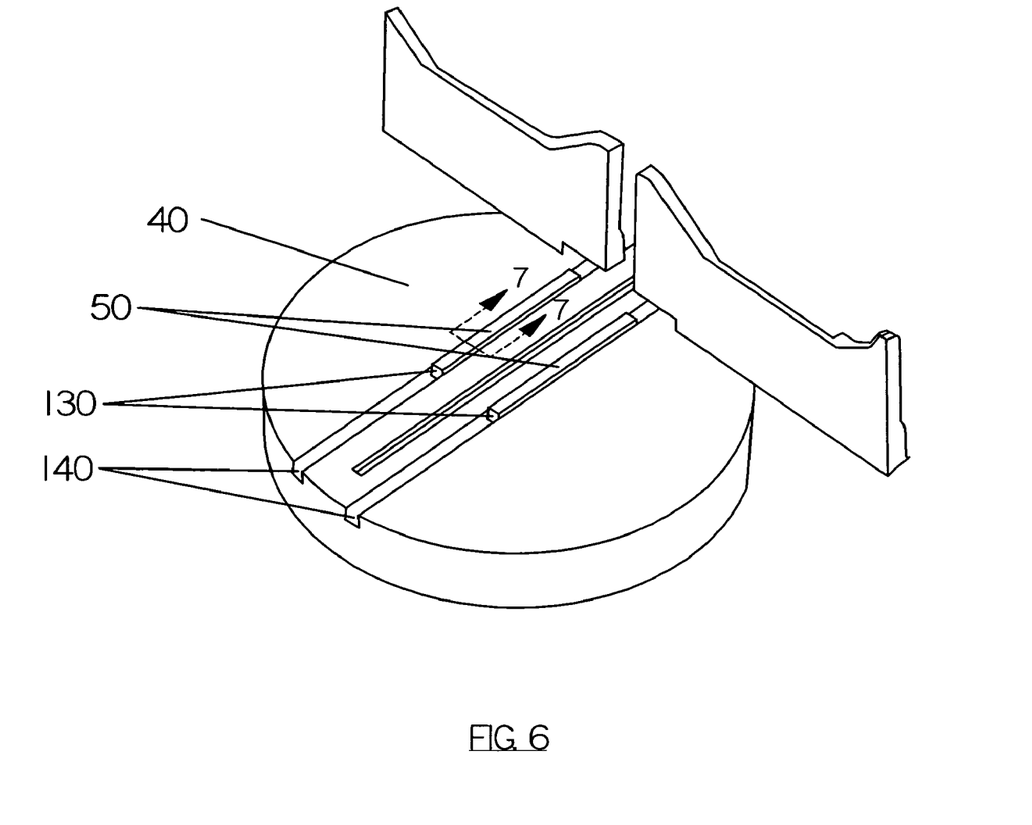
FIG. 6 shows an isometric view of a bar sliding in a channel that positions the offset.
Figure 7:
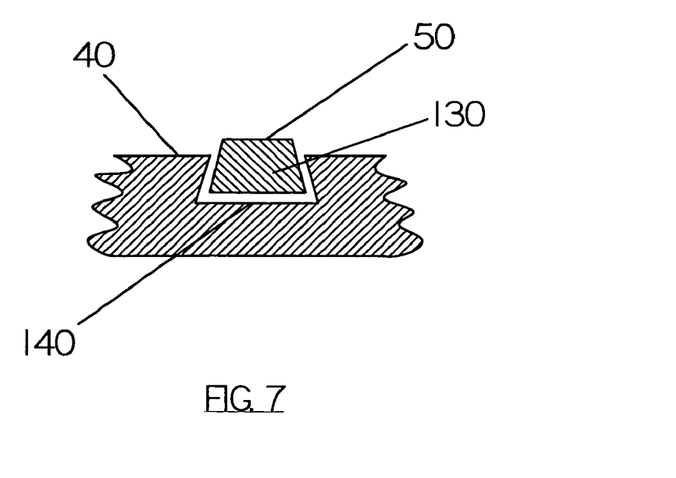
FIG. 7 shows a section view of the bar that slides in a channel.

FIGS. 6-7—Alternate Embodiment

An alternate embodiment of the saw of the present invention is illustrated in FIG. 6 (isometric view) and FIG. 7 (section view), where the offset 50 is defined via a sliding bar 130 that slides in a channel 140. Referring to FIG. 7, notice that the bar 130 is held captive in the channel 140 due to the bar 130 and the channel 140 being wider at the innermost portions. The bar 130 can slide to a position that would engage the cutting material (not shown) to a position that would be clear of the cutting material.

Figure 8:
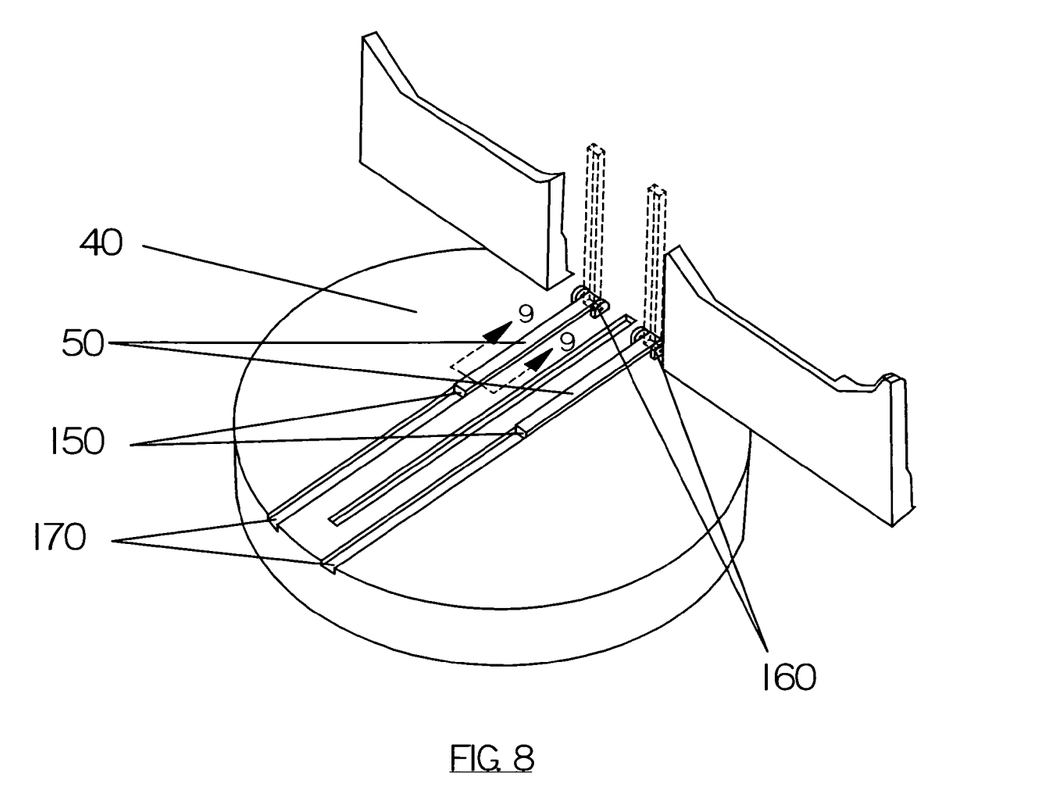
FIG. 8 shows an isometric view of a bar that rotates into a channel to position the offset.
Figure 9:
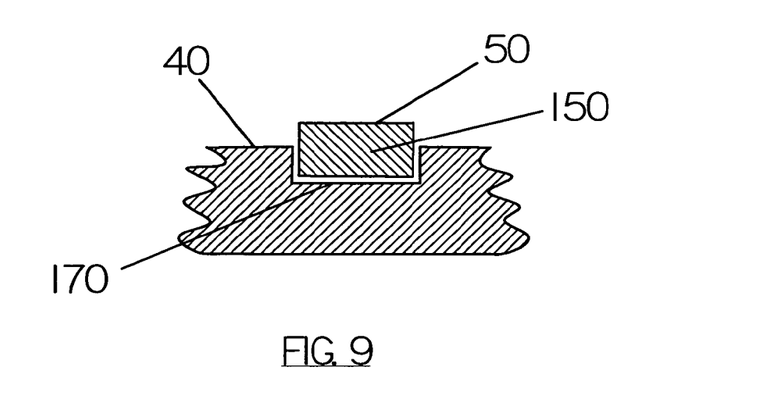
FIG. 9 shows a section view of the bar that rotates into a channel.

FIGS. 8-9—Alternate Embodiment

An alternate embodiment of the saw of the present invention is illustrated in FIG. 8 (isometric view) and FIG. 9 (section view), where the offset 50 is defined via a rotating bar 150 that rotates about a hinge 160 from a position in the channel 170 to a position (as represented by the dashed lines) clear of the cutting material resting surface 40 and thus clear of the cutting material (not shown). Referring to FIG. 9, notice that the bar 150 can rotate into the channel 170 because the channel 170 and the bar 150 are shaped such that the bar 150 is not held captive by the channel 170.

Figure 10:
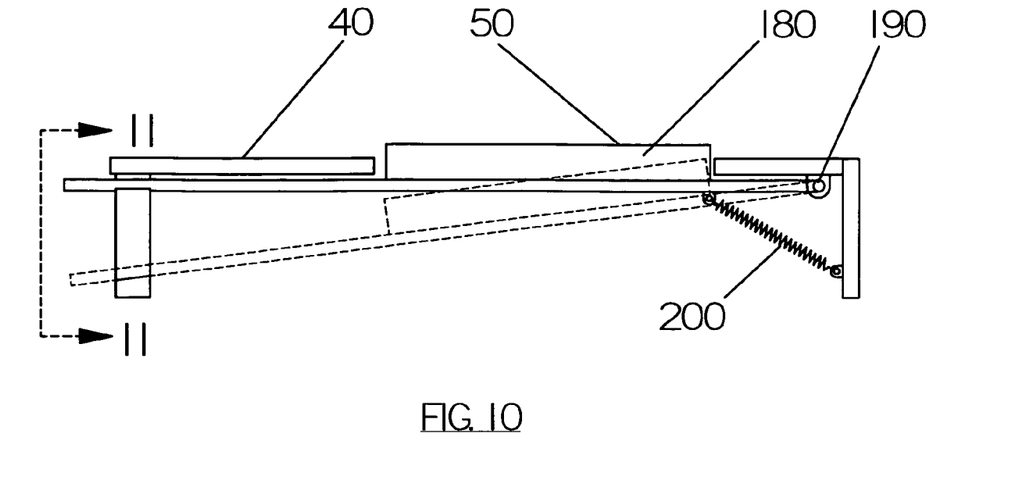
FIG. 10 shows a front view of a bar that rotates from underneath to position the offset.
Figure 11:
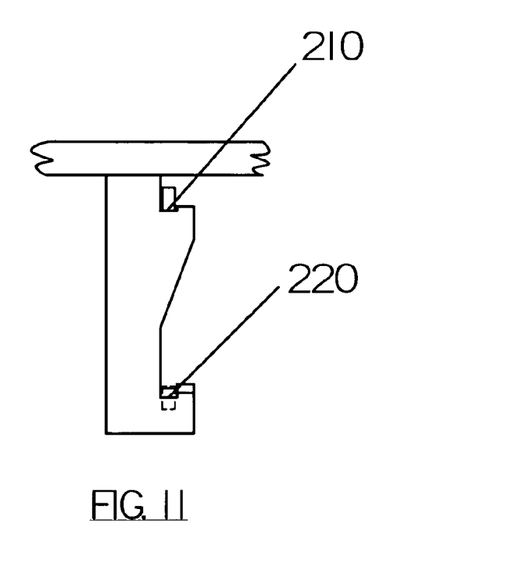
FIG. 11 shows a left side view of a bar that rotates from underneath.

FIGS. 10-11—Alternate Embodiment

An alternate embodiment of the saw of the present invention is illustrated in FIG. 10 (isometric view) and FIG. 11 (left view), where the offset 50 is defined via an offset defining structure 180 that rotates about a hinge 190 constrained either by the first positioning surface 210 or by the second positioning surface 220, wherein the spring 200 holds the offset defining structure 180 on the positioning surfaces (210, 220). When the offset defining structure 180 is positioned via the first positioning surface 210, then the offset 50 would engage the cutting material (not shown). When the offset defining structure 180 is positioned via the second positioning surface 220, then the offset 50 would not engage the cutting material.

Figure 12:
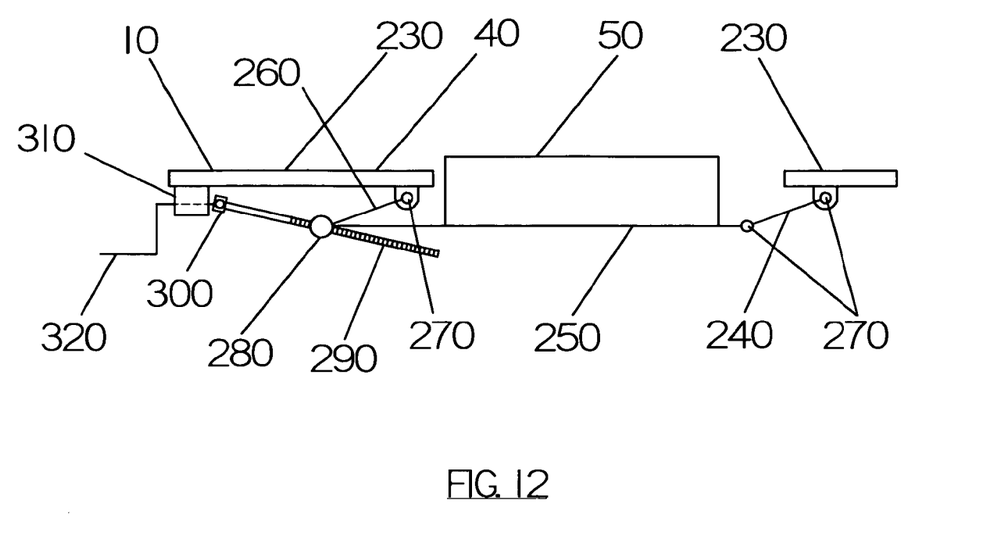
FIG. 12 shows a front view of a four bar mechanism that positions the offset where the mechanism is positioned via a thread rod.

FIG. 12—Alternate Embodiment

An alternate embodiment of the saw of the present invention is illustrated in FIG. 12 (two dimensional view), where the offset 50 is positioned via a four bar mechanism. The first bar 230 is defined by the structure of the saw 10, bar two 240 is connected on one end to bar one 230 and on the other end to bar three 250, the other end of bar three 250 is connected to bar four 260, and the other end of bar four 260 is connected to bar one 230. The bars are connected via three rotational joints 270 and one rotational joint with a threaded receptor 280. When the handle 320 is rotated, the universal joint 300 rotates, which rotates the threaded rod 290 which interfaces with the rotational joint with a threaded receptor 280. This rotation results in the positioning of the four bar mechanism such that the offset 50 is positioned at a plurality of positions below the cutting material resting surface 40 to a plurality of positions above the cutting material resting surface 40.

Figure 13:
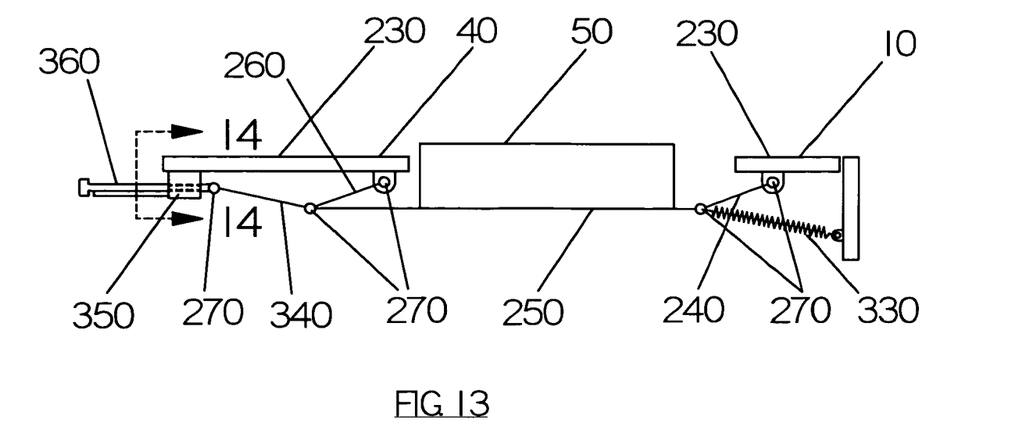
FIG. 13 shows a front view of a four bar mechanism that positions the offset where the mechanism is positioned via a latch.
Figure 14:
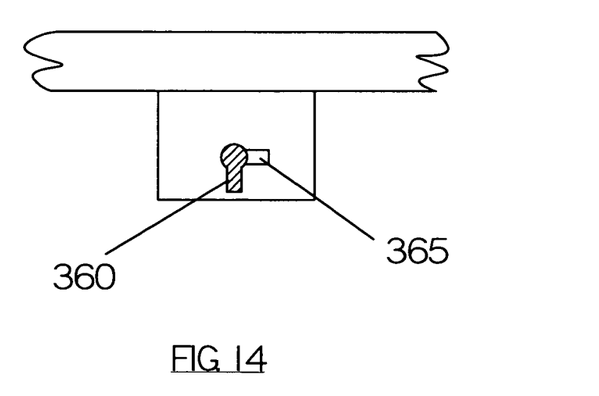
FIG. 14 shows a section view of a four bar mechanism that positions the offset where the mechanism is positioned via a latch.

FIGS. 13-14—Alternate Embodiment

An alternate embodiment of the saw of the present invention is illustrated in FIG. 13 (two dimensional view) and FIG. 14 (section view), where the offset 50 is positioned via a four bar mechanism. The first bar 230 is defined by the structure of the saw 10, bar two 240 is connected on one end to bar 230 and on the other end to bar three 250, the other end of bar three 250 is connected to bar four 260, and the other end of bar four 260 is connected to bar one 230. The bars are connected via four rotational joints 270. The four bar mechanism is positioned via a latch 360 that is connected to a connecting link 340 that is attached to the four bar mechanism. When the latch 360 is rotated one way it slides through a key hole 370 in the structure 350 positioning the latch 360. The latch 360 is restrained via a spring 330. Depending on the engagement of the latch, the four bar mechanism is positioned such that the offset 50 is either above the cutting material resting surface 40 or below the cutting material resting surface 40.

Figure 15:
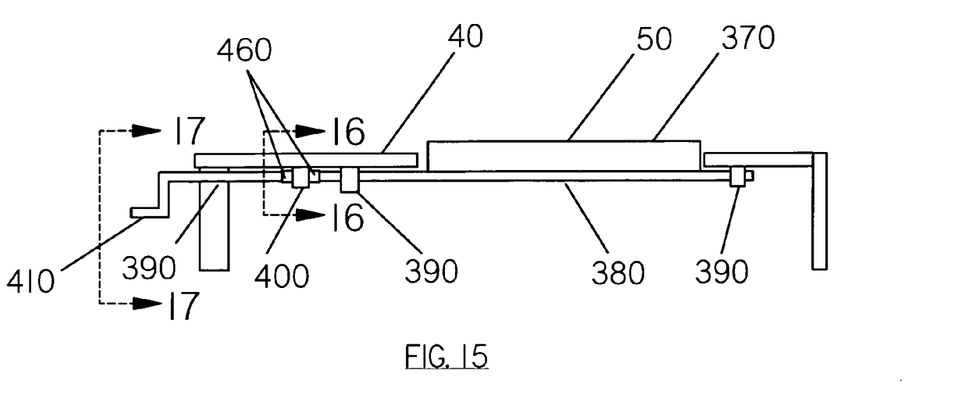
FIG. 15 shows a 2 dimensional view of a rectangular-shaped rotating bar that positions the offset.
Figure 16:
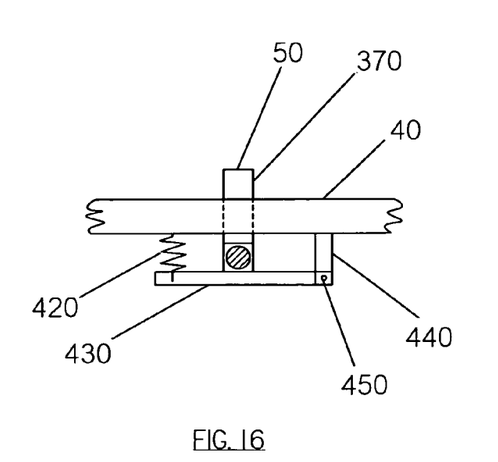
FIG. 16 shows the first section view of a rectangular-shaped rotating bar that positions the offset.
Figure 17:
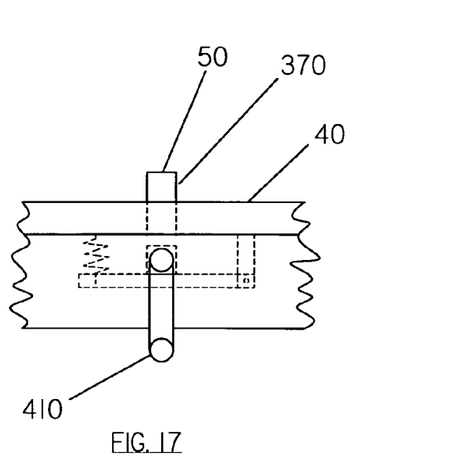
FIG. 17 shows the left side view of a rectangular-shaped rotating bar that positions the offset.
Figure 18:
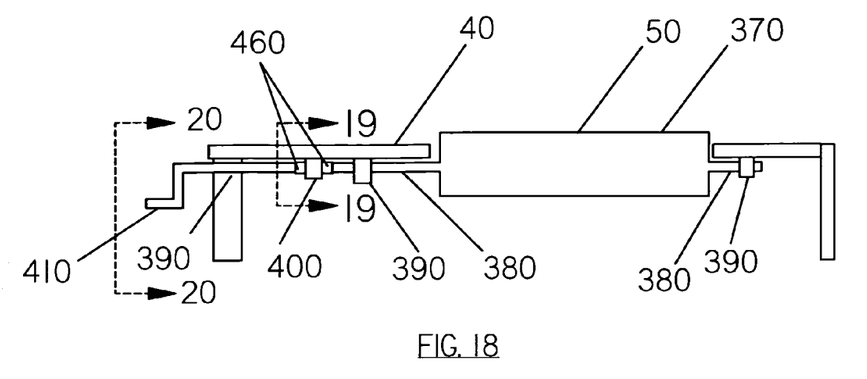
FIG. 18 shows a 2 dimensional view of a triangular-shaped rotating bar that positions the offset.
Figure 19:
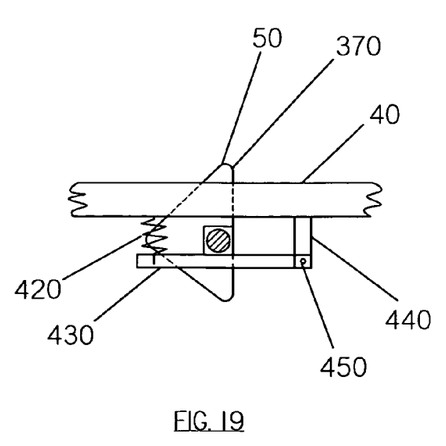
FIG. 19 shows the first section view of a triangular-shaped rotating bar that positions the offset.
Figure 20:
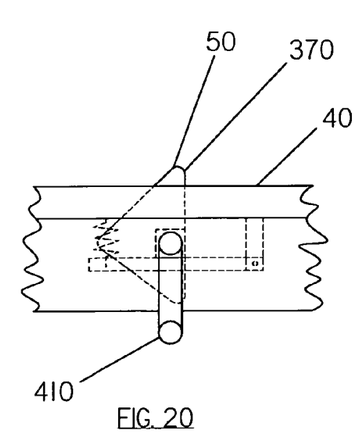
FIG. 20 shows the left side view of a triangular-shaped rotating bar that positions the offset.
Figure 21:
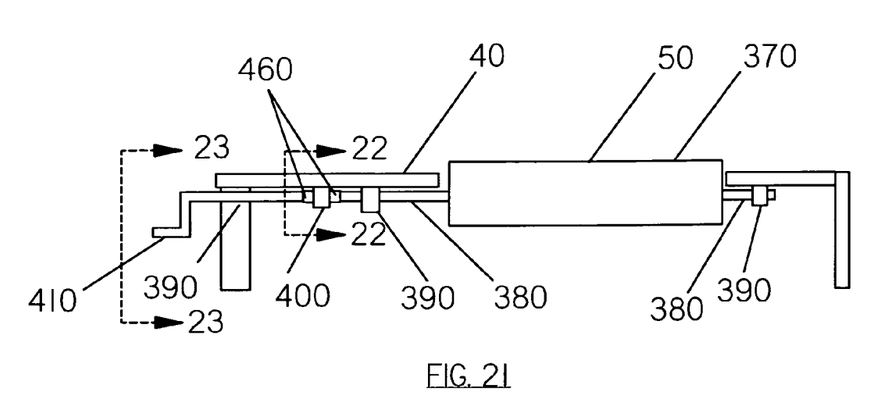
FIG. 21 shows a 2 dimensional view of a circular-shaped rotating bar that positions the offset.
Figure 22:
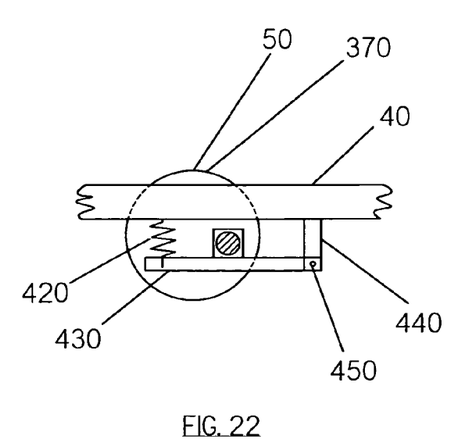
FIG. 22 shows the first section view of a circular-shaped rotating bar that positions the offset.
Figure 23:
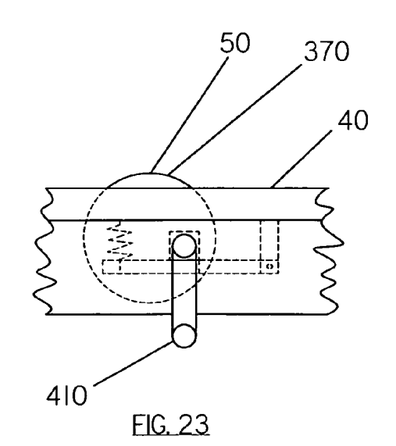
FIG. 23 shows the left side view of a circular-shaped rotating bar that positions the offset.
Figure 24:
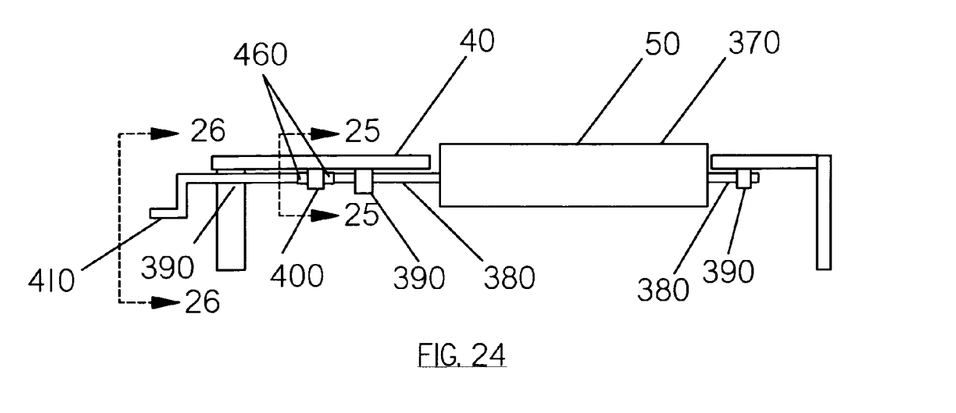
FIG. 24 shows a 2 dimensional view of an oval-shaped rotating bar that positions the offset.
Figure 25:
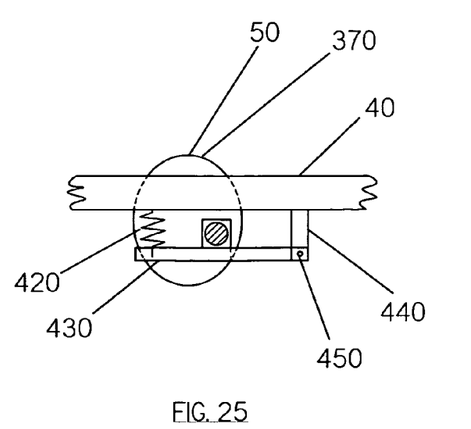
FIG. 25 shows the first section of an oval-shaped rotating bar that positions the offset.
Figure 26:
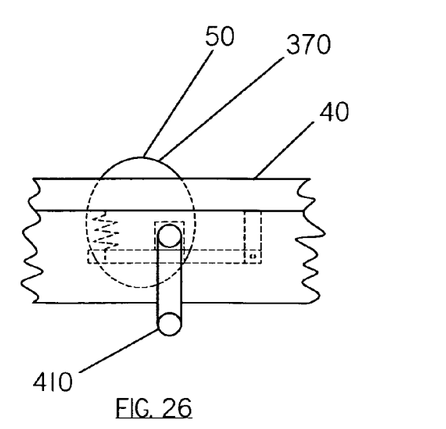
FIG. 26 shows the left side view of an oval-shaped rotating bar that positions the offset.
Figure 27:
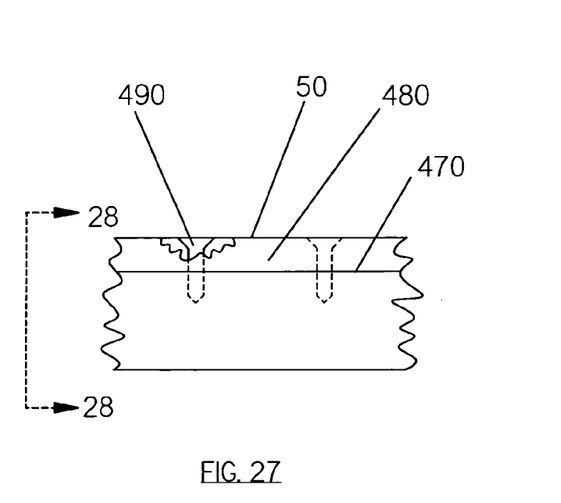
FIG. 27 shows a 2 dimensional view of an attachment that repositions the offset.
Figure 28:
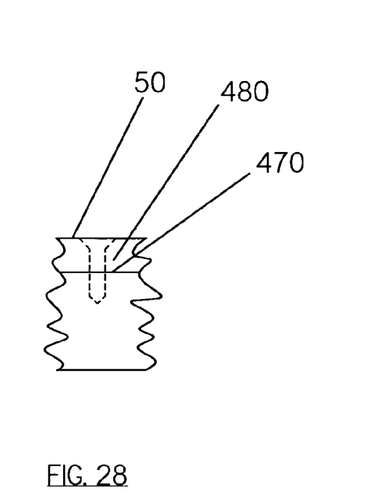
FIG. 28 shows the left side view of an attachment that repositions the offset.

FIGS. 15-17—Alternate Embodiment

An alternate embodiment of the saw of the present invention is illustrated in FIG. 15 (two dimensional view), FIG. 16 (section view) and FIG. 17 (left side view), where the offset 50 is positioned via a structural member 370 that is attached to the shaft 380 that is held in place via bearings 390 such that when the shaft 380 is rotated to one position, the offset 50 is above the cutting material resting surface 40 and when the shaft 380 is rotated to another position, the offset 50 is below the cutting material resting surface 40. The shaft 380 would be held in position via the horizontal restraining member 430 interfacing with the rectangular portion 460 of the shaft 390. The horizontal restraining member 430 pivots about the hinge 450 that is attached to the vertical structural member 440. The spring 420 forces the horizontal restraining member 430 against the rectangular portion 460 of the shaft 390 which fixes the shaft 390 in place.

Operation—FIGS. 5-17

The operation of the saw of the present invention entails moving the offset 50 from a position below the cutting material resting surface 40 to a position above the cutting material resting surface 40 and vice versa via the mechanisms depicted in FIGS. 5-17. The positioning of the offset affects the miter cutting angle. A carpenter might make several cuts where the change in the miter angle is needed, and then reposition the offset 50 such that no change in miter angle would occur.

ADVANTAGES

Based on the description above, the advantages of the saw of the present invention follow:

The power saw with miter angle adjustment has the following advantages:
 a) This invention provides a way for a carpenter to quickly make a small miter angle change and to quickly remove the miter angle change. The change in miter angle is very precise (i.e. the same change every time).
 b) This invention makes it very clear that the miter angle adjustment is or is not in place.
 c) This invention greatly improves the ability of a professional carpenter to make consistent high quality cuts where the adjoining boards contact on edge.
 d) This invention does not impede in any way the normal use of the saw when the miter angle adjustment is not in place.

CONCLUSION, RAMIFICATIONS, AND SCOPE

This invention provides a saw that allows small adjustments in miter angles to be made quickly and precisely. Additionally, this invention makes it very clear whether the adjustment is or is not in place.

Although the description above contains many specifics, these should not be construed as limiting the scope of the invention but as merely providing illustrations of some of the presently preferred embodiments of this invention. For example, there are many ways to hold a four bar mechanism in place, most if not all of which would be applicable to this invention. Additionally, there are many ways to constrain a shaft that rotates as well as many ways to configure and implement a rack and pinion system. In general, there are many ways to position an offset that would be applicable to this invention. The important characterizing feature is that the offset is positioned.

The invention claimed is:

1. A power saw comprising:
 a motor,
 a motor housing,
 a blade driven by said motor,
 a substantially circular resting surface for supporting a cutting material wherein said motor, said motor housing, and said blade are disposed above said resting surface, said resting surface including an elongated slot for passing the blade therethrough,
 at least one elongated opening disposed substantially parallel and adjacent said elongated slot on said resting surface,
 at least one offset being positionable through said at least one elongated opening wherein said at least one offset is adjustable from a non-operating position wherein said at least one offset is disposed below said resting surface to an operating position wherein said at least one offset is extending above said resting surface to alter an angle between said blade and said cutting material.

2. The power saw of claim 1 wherein said offset is adjustable via a rack and pinion system comprising at least one rack, at least one pinion, and at least one handle that rotates the at least one pinion wherein said rack and said pinion are positioned such that said offset adjusts substantially normal to said resting surface.

3. The power saw of claim 1 wherein said at least one offset rotates from underneath said resting surface through said at least one elongated opening in said resting surface to a position that would contact said cutting material.

4. The power saw of claim 3 wherein said at least one offset is restrained to a first positioning surface in said non-operating position and a second positioning surface in said operating position via at least one spring.

5. The power saw of claim 1 wherein said at least one offset is positioned through said at least one elongated opening via a bar mechanism comprising a first bar and a second bar connected to said resting surface such that said at least one offset moves substantially parallel to said resting surface from being below said resting surface to a plurality of positions above said resting surface.

6. The power saw of claim 5 wherein the motion of said bar mechanism is restrained by at least one threaded shaft having one end attached to said resting surface and the other end engages a threaded hole defined on said first bar or said second bar wherein rotation of said threaded shaft changes a position of said at least one offset.

7. The power saw of claim 5 wherein said bar mechanism is restrained via at least one latch attached to one of said first and second bars.

8. The power saw of claim 1 wherein said at least one offset comprising a bar attached to a shaft, the shaft is rotatably attached to underneath said resting surface via bearings, at least one handle attached to the shaft and at least one latch fixing a rotational position of said bar wherein said bar is rotatable to said non-operating position to said operating position by rotation of said at least one handle.

9. The power saw of claim 8 wherein said bar is substantially rectangular shaped.

10. The power saw of claim 8 wherein said bar is substantially triangular shaped.

11. The power saw of claim 8 wherein said bar is substantially circular shaped.

12. The power saw of claim 8 wherein said bar is substantially oval shaped.

13. The power saw of claim 1 wherein said offset can be extended via a plurality of removable attachments comprising a plurality of thicknesses which would increase the extent of said at least one offset.

* * * * *